US012255409B2

(12) United States Patent
Tang et al.

(10) Patent No.: US 12,255,409 B2
(45) Date of Patent: Mar. 18, 2025

(54) ARRAY ANTENNA MODULE, MANUFACTURING METHOD THEREOF, AND PHASED ARRAY ANTENNA SYSTEM

(71) Applicants: Beijing BOE Sensor Technology Co., Ltd., Beijing (CN); BOE Technology Group Co., Ltd., Beijing (CN)

(72) Inventors: Cuiwei Tang, Beijing (CN); Tienlun Ting, Beijing (CN); Jie Wu, Beijing (CN); Haocheng Jia, Beijing (CN); Ying Wang, Beijing (CN); Feng Qu, Beijing (CN); Chuncheng Che, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/611,570

(22) PCT Filed: Feb. 9, 2021

(86) PCT No.: PCT/CN2021/076302
§ 371 (c)(1),
(2) Date: Aug. 18, 2022

(87) PCT Pub. No.: WO2022/170497
PCT Pub. Date: Aug. 18, 2022

(65) Prior Publication Data

US 2023/0361466 A1 Nov. 9, 2023

(51) Int. Cl.
*H01Q 1/38* (2006.01)
*H01Q 3/36* (2006.01)

(52) U.S. Cl.
CPC ................. *H01Q 3/36* (2013.01); *H01Q 1/38* (2013.01)

(58) Field of Classification Search
CPC ......... H01Q 1/38; H01Q 3/36; H01Q 21/0075
See application file for complete search history.

(56) References Cited

U.S. PATENT DOCUMENTS

2018/0241122 A1* 8/2018 Jalali Mazlouman ... H01Q 3/34
2019/0115658 A1* 4/2019 Iannotti .............. H01Q 21/0025
2019/0131719 A1 5/2019 Haziza et al.
2019/0252774 A1* 8/2019 Rodriguez De Luis ..................... H04B 7/086
2019/0252775 A1* 8/2019 Mahanfar .............. H05K 1/144
2020/0044300 A1* 2/2020 Gölden ................... H01P 5/028
2020/0243969 A1 7/2020 Fang et al.
2020/0266553 A1* 8/2020 Cao ...................... H01Q 21/065
2021/0265713 A1 8/2021 Fang et al.
(Continued)

FOREIGN PATENT DOCUMENTS

CN 108493592 A 9/2018
CN 110137636 A 8/2019
(Continued)

*Primary Examiner* — Thien M Le
(74) *Attorney, Agent, or Firm* — Ling Wu; Stephen Yang; Ling and Yang Intellectual Property

(57) ABSTRACT

An array antenna module is provided, which includes a feed structure, a phase shift structure, and a radiation structure. The feed structure is connected to the phase shift structure, and the phase shift structure is connected to the radiation structure. The feed structure, the phase shift structure, and the radiation structure are all disposed on a glass substrate.

14 Claims, 9 Drawing Sheets

(56) References Cited

U.S. PATENT DOCUMENTS

| | | | | |
|---|---|---|---|---|
| 2021/0296772 | A1* | 9/2021 | Yu | H01Q 3/36 |
| 2021/0351518 | A1* | 11/2021 | Gorbachov | H01Q 1/2208 |
| 2022/0077579 | A1* | 3/2022 | Wang | H01Q 9/0471 |
| 2022/0285852 | A1* | 9/2022 | Xi | H01Q 21/065 |
| 2023/0098813 | A1* | 3/2023 | Fang | H01Q 3/36<br>342/372 |
| 2024/0072453 | A1* | 2/2024 | Wu | H01P 1/182 |

FOREIGN PATENT DOCUMENTS

| | | | |
|---|---|---|---|
| CN | 110176673 | A | 8/2019 |
| CN | 111293425 | A | 6/2020 |
| CN | 111316500 | A | 6/2020 |
| WO | 2013045267 | A1 | 4/2013 |

* cited by examiner

ARRAY ANTENNA MODULE, MANUFACTURING METHOD THEREOF, AND PHASED ARRAY ANTENNA SYSTEM

CROSS-REFERENCE TO RELATED APPLICATION

The present application is a U.S. National Phase Entry of International Application PCT/CN2021/076302 having an international filing date of Feb. 9, 2021 and entitled “Array Antenna Module, Manufacturing Method Thereof, and Phased Array Antenna System”, the contents of which should be construed as being hereby incorporated by reference in their entirety.

TECHNICAL FIELD

The present disclosure relates to, but is not limited to, the field of communication technologies, in particular to an array antenna module, a method for manufacturing the array antenna module, and a phased array antenna system.

BACKGROUND

A phased array antenna refers to an antenna whose shape of pattern is changed by controlling a feed phase of a radiation unit in an array antenna. A direction of a maximum value of an antenna pattern may be changed by controlling a phase to achieve a purpose of beam scanning. The phased array antenna has many advantages, such as small size, low profile, fast response speed, wide scanning range, and high scanning accuracy. The phased array antenna is widely applied, for example, the phased array antenna may be applied to communication between vehicles and satellites, array radars for unmanned driving, or security array radars.

SUMMARY

The following is a summary about the subject matters described in the present disclosure in detail. The summary is not intended to limit the scope of protection of claims.

Embodiments of the present disclosure provide an array antenna module, a method for manufacturing the array antenna module, and a phased array antenna system.

In a first aspect, an embodiment of the present disclosure provides an array antenna module, including a feed structure, a phase shift structure, and a radiation structure; the feed structure is connected to the phase shift structure, and the phase shift structure is connected to the radiation structure; the feed structure, the phase shift structure, and the radiation structure are all disposed on a glass substrate.

In some exemplary embodiments, the glass substrate includes a first substrate, a second substrate located on a side of the first substrate, and a third substrate located on a side of the second substrate away from the first substrate. The feed structure and the phase shift structure are disposed between the first substrate and the second substrate; the radiation structure is disposed on at least one side of the third substrate.

In some exemplary embodiments, the phase shift structure includes a first dielectric layer located between the first substrate and the second substrate, a first conductive layer located on a side of the second substrate close to the first dielectric layer, and a second conductive layer located on a side of the first substrate close to the first dielectric layer. An orthographic projection of the second conductive layer on the second substrate is partially overlapped with an orthographic projection of the first conductive layer on the second substrate.

In some exemplary embodiments, the first conductive layer includes a first signal line, and the second conductive layer includes first electrodes disposed periodically; orthographic projections of the first signal line and the first electrodes on the second substrate are overlapped.

In some exemplary embodiments, the feed structure includes a second dielectric layer located between the first substrate and the second substrate, and a third conductive layer located on a side of the second dielectric layer; the third conductive layer is disposed in a same layer as the first conductive layer or the second conductive layer. An orthographic projection of the second dielectric layer on the second substrate is not overlapped with an orthographic projection of the first dielectric layer on the second substrate; the first dielectric layer and the second dielectric layer are isolated from each other by a sealant.

In some exemplary embodiments, the first dielectric layer includes a liquid crystal material, and the second dielectric layer includes air.

In some exemplary embodiments, the radiation structure includes a fourth conductive layer located on a side of the third substrate away from the second substrate, and a first ground layer located on a side of the third substrate close to the second substrate.

In some exemplary embodiments, the first ground layer has at least one opening; an orthographic projection of the opening on the second substrate is overlapped with an orthographic projection of the fourth conductive layer on the second substrate, and is overlapped with the orthographic projection of the first conductive layer on the second substrate.

In some exemplary embodiments, the third conductive layer includes a second signal line, and the second signal line and the first ground layer form a parallel-fed microstrip structure or a series-fed microstrip structure.

In some exemplary embodiments, the feed structure further includes a second ground layer located on a side of the first substrate away from the second dielectric layer.

In some exemplary embodiments, the phase shift structure may include at least one phase shifter, each phase shifter has a first phase shift output terminal and a second phase shift output terminal, the first phase shift output terminal and the second phase shift output terminal are oppositely disposed, and a phase difference between the first phase shift output terminal and the second phase shift output terminal is 180 degrees.

In some exemplary embodiments, the radiation structure includes at least one radiation unit sub-array, and the at least one phase shifter and the at least one radiation unit sub-array are in a one-to-one correspondence. The radiation unit sub-array includes at least one first radiation unit and at least one second radiation unit, the first phase shift output terminal of the phase shifter is configured to feed a first radiation unit of a corresponding radiation unit sub-array, and the second phase shift output terminal of the phase shifter is configured to feed a second radiation unit of a corresponding radiation unit sub-array.

In another aspect, an embodiment of the present disclosure provides a phased array antenna system including a feed network and the array antenna module as described above. The feed network is connected to the array antenna module, and the feed network and the array antenna module are disposed on different substrates.

In some exemplary embodiments, the feed network is disposed on a Printed Circuit Board (PCB), and a ground wiring of the PCB is connected to the first ground layer of the array antenna module through a conductive adhesive.

In another aspect, an embodiment of the present disclosure provides a method for manufacturing an array antenna module, the manufacturing method is used for manufacturing the array antenna module as described above and includes: forming a feed structure and a phase shift structure between a first substrate and a second substrate; forming a radiation structure on at least one side of a third substrate; and disposing the third substrate on a side of the second substrate away from the first substrate.

Other aspects will become apparent upon reading and understanding accompanying drawings and detailed description.

BRIEF DESCRIPTION OF DRAWINGS

Accompanying drawings are used to provide a further understanding of technical solutions of the present disclosure and constitute a part of the specification to explain the technical solutions of the present disclosure together with embodiments of the present disclosure, and do not constitute any limitation on the technical solutions of the present disclosure. Shapes and sizes of one or more components in the accompanying drawings do not reflect real scales, and are only for a purpose of schematically illustrating contents of the present disclosure.

DETAILED DESCRIPTION

Figure 1:
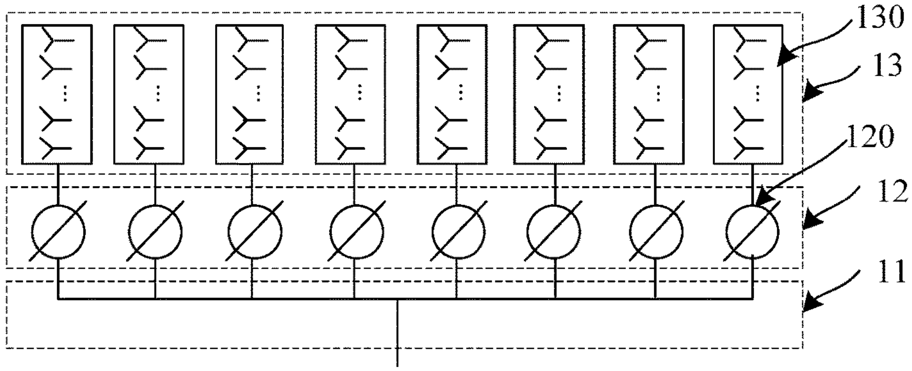
FIG. 1 is a schematic diagram of a circuit of an array antenna module according to at least one embodiment of the present disclosure.

The embodiments of the present disclosure are described below with reference to the accompanying drawings. The embodiments may be implemented in multiple different forms.

Those of ordinary skills in the art will readily understand a fact that implementations and contents may be transformed into one or more of forms without departing from the spirit and scope of the present disclosure. Therefore, the present disclosure should not be construed as being limited only to what is described in the following embodiments. The embodiments and features in the embodiments in the present disclosure may be combined randomly if there is no conflict.

In the drawings, a size of one or more constituent elements, or a thickness or a region of a layer, is sometimes exaggerated for clarity. Therefore, an embodiment of the present disclosure is not necessarily limited to the size, and shapes and sizes of multiple components in the drawings do not reflect real scales. In addition, the drawings schematically show ideal examples, and an implementation of the present disclosure is not limited to the shapes or values shown in the drawings.

The “first”, “second”, “third” and other ordinal numbers in the present disclosure are used to avoid confusion between constituent elements, instead of providing any quantitative limitation. In the present disclosure, “multiple/plurality” means two or more in quantity.

In the present disclosure, for the sake of convenience, wordings such as “central”, “upper”, “lower”, “front”, “rear”, “vertical”, “horizontal”, “top”, “bottom”, “inner”, “outer” and the others describing orientations or positional relations are used to depict positional relations of constituent elements with reference to the drawings, which are only convenient for describing the specification and simplifying description, rather than for indicating or implying that the device or element referred to must have a specific orientation, or must be constructed and operated in a particular orientation, and therefore, those wordings may not be construed as limitations on the present disclosure. The positional relations of the constituent elements may be appropriately changed according to a direction in which constituent elements are described. Therefore, the wordings are not limited in the specification, and may be replaced appropriately according to a situation.

In the present disclosure, the terms “installed”, “connected”, and “coupled” shall be understood in their broadest sense unless otherwise explicitly specified and defined. For example, a connection may be a fixed connection, or a detachable connection, or an integrated connection; it may be a mechanical connection, or an electrical connection; it may be a direct connection, or an indirect connection through middleware, or an internal connection between two elements. Those of ordinary skills in the art may understand meanings of the above terms in the present disclosure according to a situation.

In the present disclosure, an "electrical connection" includes a case where constituent elements are connected via an element having a certain electrical action. The "element having a certain electrical function" is not particularly limited as long as electrical signals may be transmitted and received between connected constituent elements. Examples of the "element having a certain electrical action" not only include electrodes and wirings, but also include switch elements such as transistors, resistors, inductors, capacitors, and other elements with one or more functions.

In the present disclosure, "parallel" refers to a state in which an angle formed by two straight lines is above −10 degrees and below 10 degrees, and thus may include a state in which an angle is above −5 degrees and below 5 degrees. In addition, "perpendicular" refers to a state in which an angle formed by two straight lines is above 80 degrees and below 100 degrees, and thus may include a state in which an angle is above 85 degrees and below 95 degrees.

In the present disclosure, "about" or "approximately" means that limits are not strictly defined and a situation within an error range of process and measurement is allowed.

At least one embodiment of the present disclosure provides an array antenna module including a feed structure, a phase shift structure, and a radiation structure. The feed structure is connected to the phase shift structure, and the phase shift structure is connected to the radiation structure. The feed structure, the phase shift structure, and the radiation structure are all disposed on a glass substrate.

According to the array antenna module provided by this embodiment, by integrating the feed structure, the phase shift structure, and the radiation structure on the glass substrate, flexibility of wirings may be improved, direct connections between different structures may be supported, and addition of a conversion connection structure due to substrate changes may be avoided. Furthermore, an accuracy of the array antenna module may be improved and manufacture costs may be reduced.

In some exemplary embodiments, the glass substrate includes a first substrate, a second substrate on a side of the first substrate, and a third substrate on a side of the second substrate away from the first substrate. The feed structure and the phase shift structure are disposed between the first substrate and the second substrate. The radiation structure is at least disposed on a side of the third substrate. In this exemplary embodiment, functions of feed, phase shift, and radiation are realized by using a framework of a three-layer glass substrate. However, this embodiment is not limited to this.

In some exemplary embodiments, the phase shift structure includes a first dielectric layer between the first substrate and the second substrate, a first conductive layer on a side of the second substrate close to the first dielectric layer, and a second conductive layer on a side of the first substrate close to the first dielectric layer. An orthographic projection of the second conductive layer on the second substrate is partially overlapped with an orthographic projection of the first conductive layer on the second substrate. In some examples, the first dielectric layer includes a liquid crystal material, which is not limited thereto in this embodiment. In some examples, the first dielectric layer may be made of another material similar to the liquid crystal material and having a dielectric constant that can be changed based on a change in an electric field. For example, the first dielectric layer may include a ferroelectric material.

In some exemplary embodiments, the first conductive layer includes a first signal line, and the second conductive layer includes first electrodes disposed periodically. Orthographic projections of the first signal line and a first electrode on the second substrate are overlapped with each other. In this exemplary embodiment, by adjusting a voltage difference between the first signal line and the first electrode, an electric field is formed between the first signal line and the first electrode, liquid crystal molecules of the first dielectric layer may be driven to deflect, thereby the dielectric constant of the liquid crystal material is changed and a capacitance value of a capacitor formed by overlapping of the first signal line and the first electrode is changed. When a microwave signal is transmitted in the first dielectric layer, a corresponding relative phase change, that is, a phase shift, will be generated. In some examples, when a microwave signal with a phase shift is transmitted to the radiation structure, it may be radiated out through the radiation structure.

In some exemplary embodiments, the feed structure includes a second dielectric layer located between the first substrate and the second substrate, and a third conductive layer located on a side of the second dielectric layer. The third conductive layer is disposed in a same layer as the first conductive layer or the second conductive layer. An orthographic projection of the second dielectric layer on the second substrate is not overlapped with an orthographic projection of the first dielectric layer on the second substrate, and the first dielectric layer and the second dielectric layer are isolated from each other by a sealant. In some examples, the third conductive layer is located on a side of the second substrate close to the second dielectric layer, and the third conductive layer may be disposed in a same layer as the first conductive layer. In some examples, the third conductive layer is located on a side of the first substrate close to the second dielectric layer, and the third conductive layer may be disposed in a same layer as the second conductive layer. However, this embodiment is not limited to this.

In some exemplary embodiments, the second dielectric layer includes air. However, this embodiment is not limited to this. For example, the second dielectric layer may include an inert gas.

In this exemplary embodiment, the feed structure and the phase shift structure are disposed in parallel between the first substrate and the second substrate, so that a direct connection between the feed structure and the phase shift structure may be achieved and costs may be reduced. The first dielectric layer and the second dielectric layer are isolated by a sealant, which may avoid an influence of the first dielectric layer on the feed structure that causes an uneven power distribution.

In some exemplary embodiments, the radiation structure includes a fourth conductive layer on a side of the third substrate away from the second substrate, and a first ground layer on a side of the third substrate close to the second substrate. In this exemplary embodiment, radiation structures may be disposed on opposite sides of the third substrate. The radiation structures, the feed structure, and the phase shift structure may share the first ground layer.

In some exemplary embodiments, the first ground layer has at least one opening. An orthographic projection of the opening on the second substrate is overlapped with an orthographic projection of the fourth conductive layer on the second substrate, and is overlapped with the orthographic projection of the first conductive layer on the second substrate. In this example, by providing an opening on the first ground layer, energy is transmitted between the phase shift structure and the radiation structure, and coupling feed is achieved. However, this embodiment is not limited to this.

For example, the phase shift structure may be directly connected to the radiation structure to achieve side feed.

In some exemplary embodiments, the third conductive layer includes a second signal line. The second signal line and the first ground layer form a parallel-fed microstrip structure or a series-fed microstrip structure. However, this embodiment is not limited to this. For example, a corresponding feed formation may be selected according to design requirements and application scenarios. For example, in a scenario of low transmission loss and no requirement for size and weight, the feed structure may be achieved by a waveguide.

In some exemplary embodiments, the feed structure includes a second dielectric layer located between the first substrate and the second substrate, a third conductive layer located on a side of the second dielectric layer, and a second ground layer located on a side of the first substrate away from the second dielectric layer. In this example, by providing the second ground layer, loss of the feed structure may be reduced and an anti-interference performance of the feed structure may be improved.

In some exemplary embodiments, the phase shift structure may include at least one phase shifter, which has a first phase shift output terminal and a second phase shift output terminal, wherein the first phase shift output terminal and the second phase shift output terminal are oppositely disposed, and a phase difference between the first phase shift output terminal and the second phase shift output terminal is 180 degrees. In this exemplary embodiment, the phase shifter works in a differential mode, and the two phase shift output terminals may be directly led out to feed the radiation structure.

In some exemplary embodiments, the radiation structure includes at least one radiation unit sub-array, and the phase shifters and radiation unit sub-arrays are in a one-to-one correspondence. The radiation unit sub-array includes at least one first radiation unit and at least one second radiation unit. The first phase shift output terminal of the phase shifter is configured to feed a first radiation unit of a corresponding radiation unit sub-array, and the second phase shift output terminal of the phase shifter is configured to feed a second radiation unit of the corresponding radiation unit sub-array. In some examples, the first radiation unit and the second radiation unit are disposed along a direction perpendicular to a scanning direction, and the first and second phase shift output terminals of the phase shifter are oppositely disposed in the direction perpendicular to the scanning direction.

The array antenna module according to this embodiment will be illustrated below through multiple examples.

Figure 2:
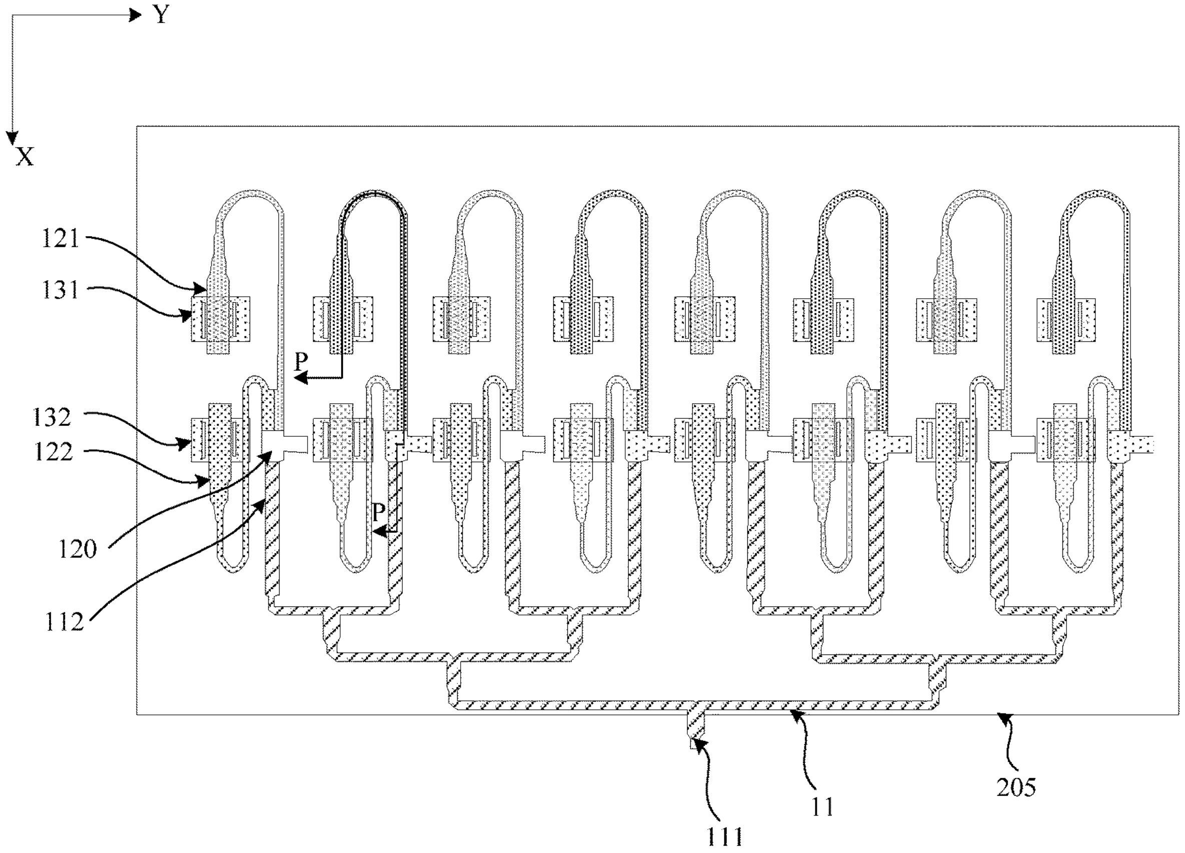
FIG. 2 is a schematic diagram of a structure of an array antenna module according to at least one embodiment of the present disclosure.

FIG. 1 is a schematic diagram of a circuit of an array antenna module according to at least one embodiment of the present disclosure. FIG. 2 is a schematic diagram of a structure of a phased array antenna module according to at least one embodiment of the present disclosure. As shown in FIGS. 1 and 2, the array antenna module of this exemplary embodiment includes a feed structure 11, a phase shift structure 12, and a radiation structure 13. The feed structure 11 is connected to the phase shift structure 12, and the phase shift structure 12 is connected to the radiation structure 13. The feed structure 11 is configured to divide one input signal into multiple outputs. The feed structure 11 includes one feed input terminal 111 and multiple feed output terminals 112. For example, the feed structure 11 can divide one signal into eight signals with equal energy for output. However, this embodiment is not limited to this. In some examples, the feed structure can divide one signal into multiple signals with unequal energy for output.

In some exemplary embodiments, the phase shift structure 12 includes multiple phase shifters 120. The multiple phase shifters 120 are connected to multiple feed output terminals 112 of the feed structure 11 in one-to-one correspondence. The multiple phase shifters 120 are sequentially disposed along a second direction Y. The feed structure 11 including eight feed output terminals 112 and eight phase shifters 120 are taken as an example in FIGS. 1 and 2. However, this embodiment is not limited to this.

In some exemplary embodiments, the radiation structure 13 includes multiple radiation unit sub-arrays 130. The multiple radiation unit sub-arrays 130 are connected to the multiple phase shifters 120 in one-to-one correspondence. Each radiation unit sub-array 130 may include a first radiation unit 131 and a second radiation unit 132. The first radiation unit 131 and the second radiation unit 132 in the radiation unit sub-array 130 may be sequentially disposed along a first direction X, and the multiple radiation unit sub-arrays 130 are sequentially disposed along the second direction Y. Radiation units in the radiation structure 13 may be disposed in a 2*8 array. However, this embodiment is not limited to this. For example, a quantity and arrangement of the radiation units may be adjusted according to a requirement such as a beam width.

In some exemplary embodiments, as shown in FIG. 2, each phase shifter 120 has a phase shift input terminal, a first phase shift output terminal 121, and a second phase shift output terminal 122. The phase shift input terminal is connected to a feed output terminal 112 of the feed structure 11. In this example, the phase shifter 120 works in a differential mode and a phase difference between the first phase shift output terminal 121 and the second phase shift output terminal 122 is 180 degrees. The first phase shift output terminal 121 and the second phase shift output terminal 122 may be directly led out to feed the radiation structure. The first phase shift output terminal 121 is configured to provide energy to the first radiation unit 131, and the second phase shift output terminal 122 is configured to provide energy to the second radiation unit 132. The first phase shift output terminal 121 and the second phase shift output terminal 122 are oppositely disposed in the first direction X. The first phase shift output terminal 121 and the second phase shift output terminal 122 are disposed oppositely to facilitate a wiring layout between the phase shifter 120 and a radiation unit.

In some exemplary embodiments, as shown in FIG. 2, the first phase shift output terminal 121 is located on a side of the second phase shift output terminal 122 away from the feed structure 11. A layout direction of ends of the first phase shift output terminal 121 and the second phase shift output terminal 122 is parallel to the first direction X.

In some exemplary embodiments, as shown in FIG. 2, the first phase shift output terminal 121 has a first wiring and a first end. The phase shift input terminal of the phase shifter and the first end are connected by the first wiring. The first wiring may include a first straight line segment, a first curved line segment, and a first transition segment which are sequentially connected. The first straight line segment is connected to the phase shift input terminal, the first curved line segment is connected between the first transition segment and the first straight line segment, and the first transition segment is connected to the first end. A width of the first transition segment may be gradually increased along a direction approaching the first end. For example, the first end may have a rectangular shape. An orthographic projection of the first end of the first phase shift output terminal 121 on the second substrate is overlapped with an orthographic projection of the first radiation unit 131 on the second substrate. However, in this embodiment, a form of the first wiring is not limited, as long as an impedance match between the phase shift input terminal and the first end can be achieved, and the first end and a second end are oppositely disposed with a phase difference of 180 degrees. In some examples, a shape and a wiring of the first phase shift output terminal may be adjusted according to an actual application scenario.

In some exemplary embodiments, as shown in FIG. 2, the second phase shift output terminal 122 has a second wiring and a second end. The phase shift input terminal of the phase shifter and the second end are connected by a second wiring. The second wiring may include a second curved line segment, a second straight line segment, a third curved line segment, and a second transition segment which are sequentially connected. The second curved line segment is connected to the phase shift input terminal. The second straight line segment is connected between the second curved line segment and the third curved line segment. The third curved line segment is connected between the second transition segment and the second straight line segment. The second transition segment is connected to the second end. A width of the second transition segment may be gradually increased along a direction approaching the second end. For example, the second end may have a rectangular shape. An orthographic projection of the second end of the second phase shift output terminal 122 on the second substrate is overlapped with an orthographic projection of the second radiation unit 132 on the second substrate. However, in this embodiment, a form of the second wiring is not limited, as long as an impedance match between the phase shift input terminal and the second end may be achieved, and the first end and the second end are oppositely disposed with a phase difference of 180 degrees. In some examples, a shape and a wiring of the second phase shift output terminal may be adjusted according to an actual application scenario.

In the present disclosure, a width indicates a feature size along a direction perpendicular to an extending direction of a wiring.

Figure 3:
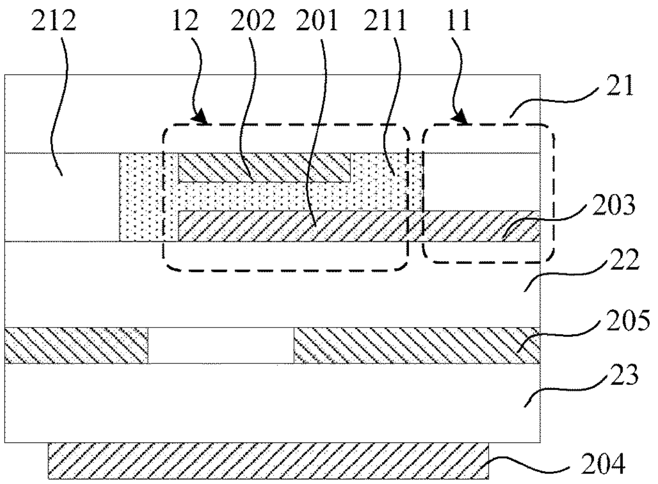
FIG. 3 is a schematic diagram of a partial section of an array antenna module according to at least one embodiment of the present disclosure.

FIG. 3 is a schematic diagram of a partial section of an array antenna module according to at least one embodiment of the present disclosure. FIG. 3 is a schematic diagram of a section along a P-P direction in FIG. 2. In some exemplary embodiments, in a plane perpendicular to the array antenna module, the array antenna module includes a first substrate 21, a second substrate 22 on a side of the first substrate 21, and a third substrate 23 on a side of the second substrate 22 away from the first substrate 21. The feed structure 11 and the phase shift structure 12 are disposed between the first substrate 21 and the second substrate 22. Radiation structures are disposed on opposite sides of the third substrate 23. The radiation structures are disposed on a side of the third substrate 23 close to the second substrate 22 and on a side of the third substrate 23 away from the second substrate 22. In this example, the first substrate 21, the second substrate 22, and the third substrate 23 are all glass substrates. In some examples, thicknesses of the first substrate 21, the second substrate 22, and the third substrate 23 may each be 100 to 1000 microns. However, this embodiment is not limited to this.

In this exemplary embodiment, a three-layer glass substrate structure is used to achieve the integration of the feed structure, the phase shift structure, and the radiation structures on the glass substrate. The array antenna module is disposed on the glass substrate as a whole, so that flexibility of wiring may be high, different structures may be directly connected, and a conversion connection structures required by separately disposing array antenna modules on different substrates may be avoided, thereby improving an accuracy of the array antenna module and reducing manufacturing costs.

In some exemplary embodiments, as shown in FIG. 3, the phase shift structure 12 includes a first dielectric layer 211 disposed between the first substrate 21 and the second substrate 22, a first conductive layer 201 disposed on a side of the second substrate 22 close to the first dielectric layer 211, and a second conductive layer 202 disposed on a side of the first substrate 21 close to the first dielectric layer 211. An orthographic projection of the second conductive layer 202 on the second substrate 22 is partially overlapped with an orthographic projection of the first conductive layer 201 on the second substrate 22. The feed structure 11 includes a second dielectric layer 212 disposed between the first substrate 21 and the second substrate 22, and a third conductive layer 203 disposed on a side of the second substrate 22 close to the second dielectric layer 212. The radiation structure includes a fourth conductive layer 204 disposed on a side of the third substrate 23 away from the second substrate 22, and a first ground layer 205 located on a side of the third substrate 23 close to the second substrate 22. The first ground layer 205 may include a planar ground electrode. However, this embodiment is not limited to this. In this exemplary embodiment, the first ground layer 205 is shared as a ground plane by the feed structure 11, the phase shift structure 12, and the radiation structure 13.

In some exemplary embodiments, the first dielectric layer 211 includes a liquid crystal material. Liquid crystal molecules in the first dielectric layer 211 may be positive liquid crystal molecules or negative liquid crystal molecules. However, this embodiment is not limited to this. In some examples, the first dielectric layer may be made of another material similar to the liquid crystal material and having a dielectric constant can be changed based on a change in an electric field. For example, the first dielectric layer may include a ferroelectric material.

In some exemplary embodiments, the second dielectric layer 211 includes air or an inert gas. However, this embodiment is not limited to this.

In some exemplary embodiments, a support column may be disposed on a surface of the first substrate 21 facing the second substrate 22 to maintain a distance between the first substrate 21 and the second substrate 22 and ensure surface uniformity of a cell formed by the first substrate 21 and the second substrate 22. The support column may be made of an organic material. However, this embodiment is not limited to this. For example, a protrusion may be disposed on a surface of the second substrate 22 facing the first substrate 21.

In some exemplary embodiments, the first substrate 21 and the second substrate 22 are cell-aligned, and a first region and a second region are isolated between the first substrate 21 and the second substrate 22 by a sealant, and the first dielectric layer 211 is formed in the first region and the second dielectric layer 212 is formed in the second region. A phase shifter is formed in the first region by using the first dielectric layer 211, the first conductive layer 201, and the second conductive layer 202, and a feed structure is formed in the second region by using the second dielectric layer 212 and the third conductive layer 203. The first region and the second region are isolated by a sealant, which may avoid an influence of liquid crystal deflection in the first dielectric layer on unevenness of power distribution, and reduce an amount of a liquid crystal material, thereby reducing costs.

In some exemplary embodiments, the first conductive layer 201 may include a first signal transmission line, and the second conductive layer 202 includes first electrodes disposed periodically. The first signal transmission line and the first ground layer 205 form a microstrip transmission structure. However, this embodiment is not limited to this. For example, a phase shifter may be made of a transmission structure such as a strip line, a coplanar waveguide, or a substrate integrated waveguide.

In this exemplary embodiment, the first signal transmission line and a first electrode are overlapped to form variable capacitance. A voltage difference between the first conductive layer and the second conductive layer is adjusted to drive the liquid crystal molecules in the first dielectric layer 211 to deflect, thereby changing a dielectric constant of the first dielectric layer and changing a capacitance value, so that a corresponding phase shift is generated when a microwave signal is propagated in the first dielectric layer, and then is transmitted to a radiation unit, and radiated by the radiation unit to achieve beam scanning. However, this embodiment is not limited thereto.

Figure 4:
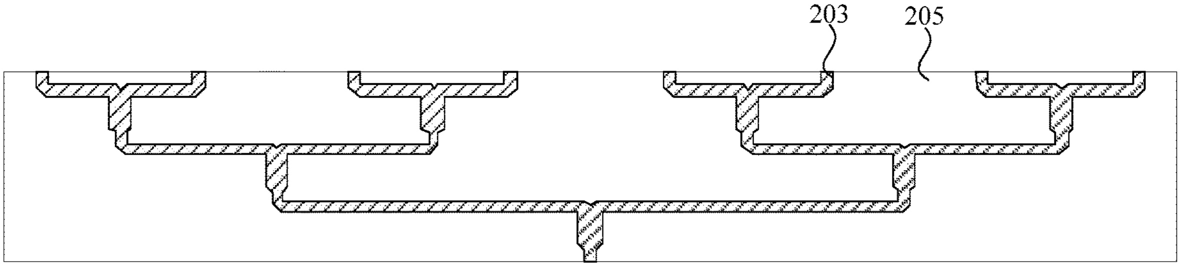
FIG. 4 is a schematic plan view of a feed structure according to at least one embodiment of the present disclosure.

FIG. 4 is a schematic plan view of a feed structure according to at least one embodiment of the present disclosure. In some exemplary embodiments, as shown in FIG. 4, the third conductive layer 203 includes a second signal line, wherein the second signal line and the first ground layer 205 constitute a parallel-fed microstrip structure. In this example, an impedance of 50Ω at the feed input terminal and the feed output terminal of the feed structure is converted through a ¼ wavelength transmission line.

Figure 5:
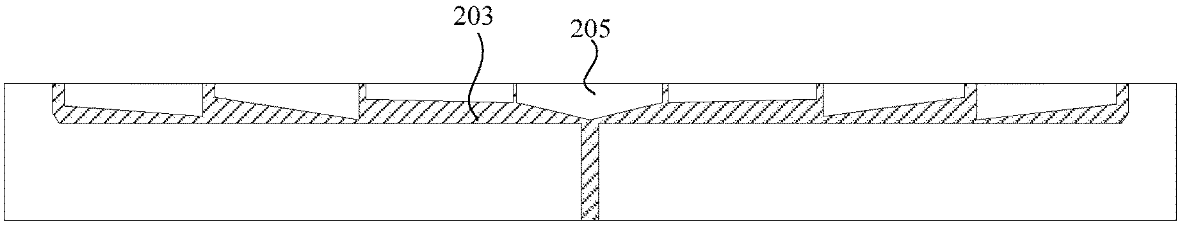
FIG. 5 is another schematic plan view of a feed structure according to at least one embodiment of the present disclosure.

FIG. 5 is another schematic plan view of a feed structure according to at least one embodiment of the present disclosure. In some exemplary embodiments, as shown in FIG. 5, the third conductive layer 203 includes a second signal line, wherein the second signal line and the first ground layer 205 constitute a series-fed microstrip structure. In this example, an output amplitude and phase difference of each port of each feed output terminal may be measured separately for compensation.

Figure 6A:
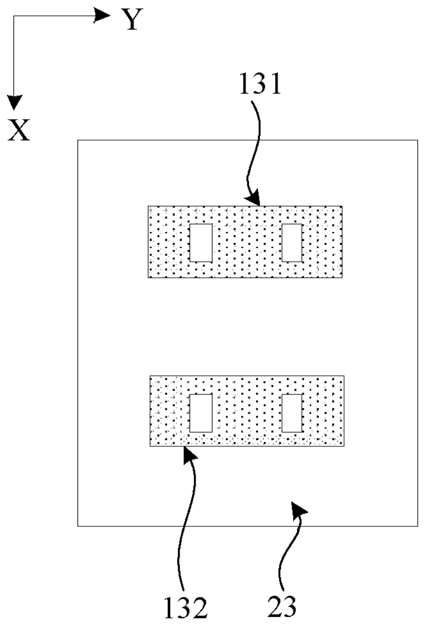
FIG. 6A is a schematic plan view of a radiation unit sub-array according to at least one embodiment of the present disclosure.

FIG. 6A is a schematic plan view of a radiation unit sub-array according to at least one embodiment of the present disclosure. As shown in FIG. 6A, the first radiation unit 131 and the second radiation unit 132 are sequentially disposed along a first direction X. In some examples, the first direction X is perpendicular to a scanning direction, and the second direction Y is the scanning direction. Two working modes, a fundamental mode and a higher-order mode, may be stimulated respectively to achieve a scanning angle of ±45 degrees. In this example, the first radiation unit 131 and the second radiation unit 132 may include patch electrodes. A shape of a patch electrode may be rectangular. However, this embodiment is not limited to this. For example, a shape of a patch electrode may be other shapes such as a triangle.

In some exemplary embodiments, each patch electrode of the first radiation unit 131 and the second radiation unit 132 are provided with two openings, and positions of the openings are positions of a maximum current of a radiation unit. For example, as shown in FIG. 6A, the two openings on a patch electrode may be symmetrical along a center line of the patch electrode in the second direction Y, wherein the center line is parallel to the first direction X. The two openings may be rectangular. However, this embodiment is not limited to this. As shown in FIG. 2, orthographic projections of the first phase shift output terminal 121 of the phase shifter and two openings of a patch electrode of the first radiation unit 131 on the third substrate are not overlapped, and an orthographic projection of the first phase shift output terminal 121 on the third substrate is located between the two openings of the patch electrode of the first radiation unit 131. Orthographic projections of the second phase shift output terminal 122 of the phase shifter and two openings of a patch electrode of the second radiation unit 132 on the third substrate are not overlapped, and an orthographic projection of the second phase shift output terminal 122 on the third substrate is located between the two openings of the patch electrode of the second radiation unit 132. In this exemplary embodiment, transmission paths can be increased, a distance between radiation units can be reduced, and a unit size can be reduced by disposing openings on the radiation units.

Figure 6B:
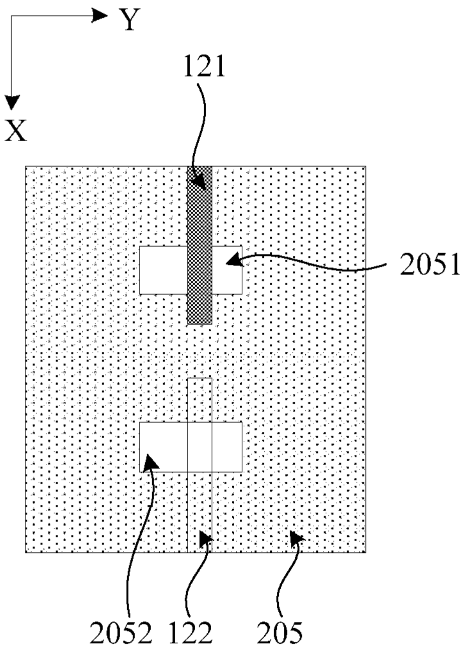
FIG. 6B is a partial schematic plan view of a first ground layer and a first conductive layer corresponding to the radiation unit sub-array of FIG. 6A.

FIG. 6B is a partial schematic plan view of a first ground layer and a first conductive layer corresponding to the radiation unit sub-array of FIG. 6A. As shown in FIG. 6B, a planar ground electrode of the first ground layer 205 has multiple openings. The multiple openings include a first opening 2501 corresponding to the first phase shift output terminal 121 and a second opening 2502 corresponding to the second phase shift output terminal 122. The first opening 2501 and the second opening 2502 are symmetrically distributed along a symmetry axis parallel to the second direction Y. An orthographic projection of the first opening 2051 on the second substrate is overlapped with an orthographic projection of the patch electrode of the first radiation unit (located on the fourth conductive layer) on the second substrate, and is overlapped with an orthographic projection of the first phase shift output terminal 121 of the phase shifter (located on the first conductive layer) on the second substrate. An orthographic projection of the second opening 2052 on the second substrate is overlapped with an orthographic projection of the patch electrode of the first radiation unit (located on the fourth conductive layer) on the second substrate, and is overlapped with an orthographic projection of the second phase shift output terminal 122 of the phase shifter (located on the first conductive layer) on the second substrate. The first opening 2501 and the second opening 2502 may both be rectangular. However, this embodiment is not limited to this. For example, the openings may have other shapes.

In this exemplary embodiment, the phase shifter may couple and feed a radiation unit through an opening on a ground electrode to transmit energy to the radiation unit.

Figure 7:
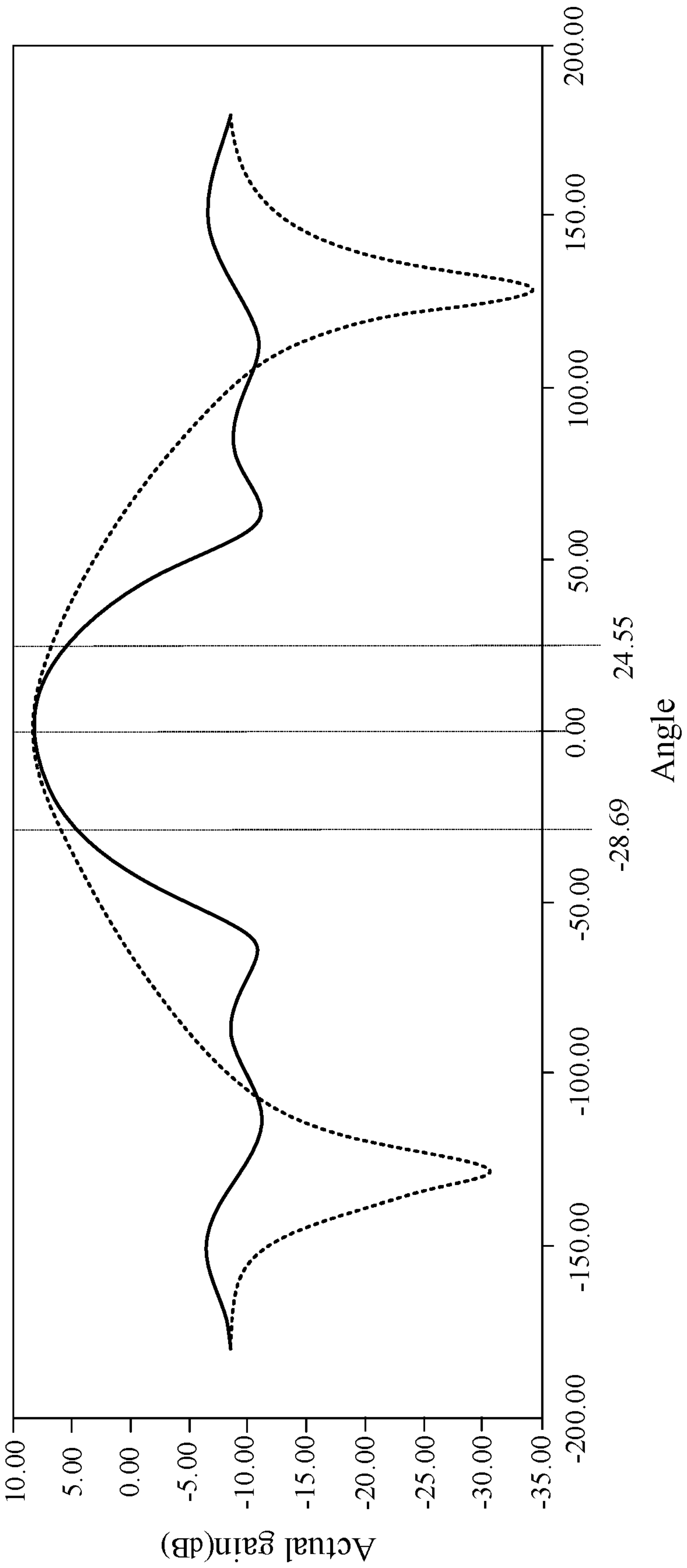
FIG. 7 is a simulation pattern of a radiation unit sub-array according to at least one embodiment of the present disclosure.

FIG. 7 is a simulation pattern of a radiation unit sub-array according to at least one embodiment of the present disclosure. An abscissa of FIG. 7 is a pitch angle θ, which shows an included angle with respect to the Z axis, and an ordinate is an actual gain. A solid line in FIG. 7 represents a curve of actual gain values of the radiation unit sub-array corresponding to different values of 0 when an azimuth angle φ=0 degree, that is, a radiation pattern of an xoz plane. Similarly, a dotted line in FIG. 7 represents a curve of actual gain values of the radiation unit sub-array corresponding to different values of 0 when an azimuth angle φ=90 degrees, that is, a radiation pattern of a yoz plane. FIG. 7 may characterize radiation characteristics of the radiation unit sub-array with a large loss direction angle of 2db in a direction of 0 degree.

In some exemplary embodiments, during a manufacturing process of the array antenna module, the second conductive layer is formed on the first substrate, and first and third conductive layers are formed on the second substrate, and the first and second substrates are cell-aligned so that the second conductive layer is opposite to the first and third conductive layers. Then, the first region and the second region are formed between the first substrate and the second substrate by a sealant, a liquid crystal material is injected into the first region to form the first dielectric layer, and air in the second region is used as the second dielectric layer. The fourth conductive layer and the first ground layer are respectively formed on two sides of the third substrate. Then, the third substrate is attached to a side of the second substrate away from the first substrate by using a sheet-like adhesive on a side of the first ground layer, so that the third substrate is fixed to a cell formed by the second substrate and the first substrate. The adhesive is not conductive. In some examples, alignment marks may be disposed on the second substrate and the third substrate for Charge Coupled Device (CCD) positioning, so as to ensure a high accuracy of bonding an alignment. In some examples, the first conductive layer, the second conductive layer, the third conductive layer, the fourth conductive layer, and the first ground layer may be made of metal materials, such as aluminum, silver, nickel, molybdenum, or iron. However, this embodiment is not limited to this.

Figure 8:
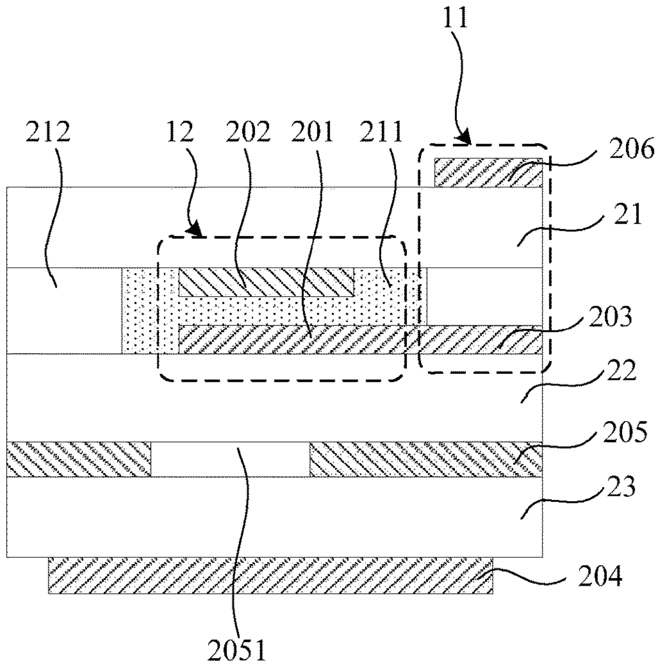
FIG. 8 is another schematic diagram of a partial section of an array antenna module according to at least one embodiment of the present disclosure.

FIG. 8 is another schematic diagram of a partial section of an array antenna module according to at least one embodiment of the present disclosure. In some exemplary embodiments, as shown in FIG. 8, the feed structure 11 includes a second dielectric layer 212 located between the first substrate 21 and the second substrate 22, a third conductive layer 203 located on a side of the second dielectric layer 212, and a second ground layer 206 located on a side of the first substrate 21 away from the second dielectric layer 212. The third conductive layer 203 and the first conductive layer 201 are disposed in a same layer. Orthographic projections of the third conductive layer 203 and the second ground layer 206 on the second substrate 22 are overlapped. In some examples, the second ground layer 206 may be a planar electrode. However, this embodiment is not limited to this.

In this exemplary embodiment, the feed structure has two ground planes, wherein one ground plane is a first ground layer 205 shared with the radiation structure, and the other ground plane is achieved by forming a second ground layer 206 on the side of the first substrate 21 away from the second dielectric layer 212. In this exemplary embodiment, loss of the feed structure may be reduced and an ability to resist external interference may be improved by a double-layer ground plane.

For other structures of the array antenna module in this exemplary embodiment, reference may be made to the description of the above embodiments, which will not be repeated here.

At least one embodiment of the present disclosure further provides a method for manufacturing an array antenna module, which is used for manufacturing the array antenna module as described above. The manufacturing method includes: forming a feed structure and a phase shift structure between a first substrate and a second substrate; forming a radiation structure on at least one side of a third substrate; disposing the third substrate on a side of the second substrate away from the first substrate.

The descriptions of the aforementioned embodiments may be referred for the manufacturing method of this embodiment, which will not be repeated here.

At least one embodiment of the present disclosure further provides a phased array antenna system, which includes a feed network and at least one array antenna module as described in the above-mentioned embodiments. The feed network is connected to the array antenna module, and the feed network and the array antenna module are disposed on different substrates.

In some exemplary embodiments, the feed network is disposed on a Printed Circuit Board (PCB), and a ground wiring of the PCB is connected to the first ground layer of the array antenna module through a conductive adhesive.

In some exemplary embodiments, the feed network includes a feed unit and at least one signal conditioning unit, wherein the feed unit is connected to the signal conditioning unit; and signal conditioning units are connected to array antenna modules in one-to-one correspondence.

Figure 9:
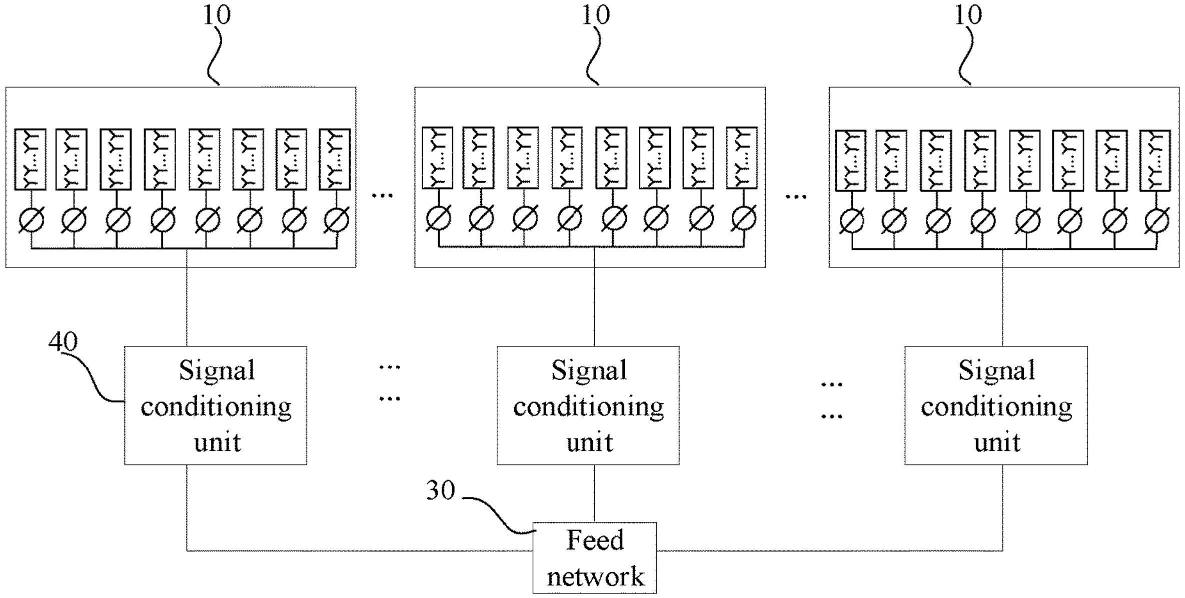
FIG. 9 is a schematic diagram of a phased array antenna system according to at least one embodiment of the present disclosure.

FIG. 9 is a schematic diagram of a phased array antenna system according to at least one embodiment of the present disclosure. In some exemplary embodiments, as shown in FIG. 9, the phased array antenna system includes multiple array antenna modules 10 disposed on a glass substrate, a feed network 30 and multiple signal conditioning units 40 disposed on a Printed Circuit Board (PCB). The multiple array antenna modules 10 and the multiple signal conditioning units 40 are connected in one-to-one correspondence. The feed network 30 is connected to the multiple signal conditioning units 40. In some examples, the feed network 30 may divide an input signal into sixteen output signals, and a quantity of the array antenna modules 10 and a quantity of the signal conditioning units 40 may both be sixteen. However, this embodiment is not limited to this.

In this exemplary embodiment, a signal conditioning unit 40 is added between the feed network 30 and an array antenna module 10, an amplitude of each output signal of the feed network 10 may be controlled by the signal conditioning unit 40, an influence of material loss on performance of the phased array antenna system may be reduced.

Figure 10:
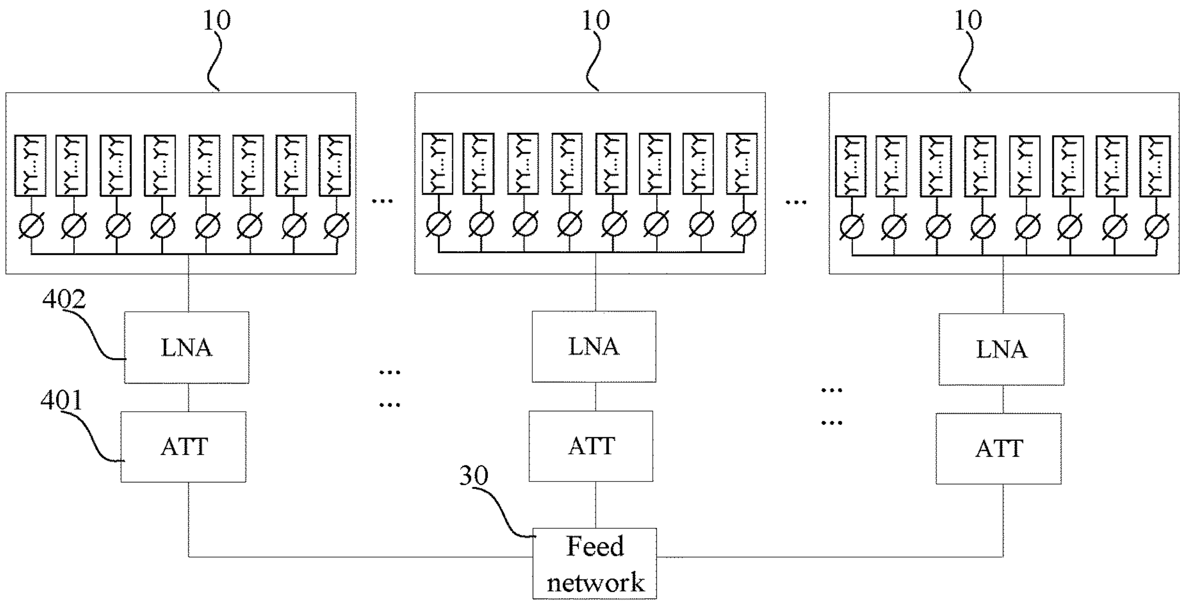
FIG. 10 is an example diagram of a phased array antenna system according to at least one embodiment of the present disclosure.

FIG. 10 is an example diagram of a phased array antenna system according to at least one embodiment of the present disclosure. In some exemplary embodiments, as shown in FIG. 10, multiple array antenna modules 10 are connected to multiple signal conditioning units in one-to-one correspondence. The array antenna modules 10 are configured to receive signals. A signal conditioning unit includes an attenuator (ATT) 401 and a Low Noise Amplifier (LNA) 402. The feed network 30 is connected to the attenuator 401, the attenuator 401 is connected to the LNA 402, and the LNA 402 is connected to the array antenna module 10.

Figure 11:
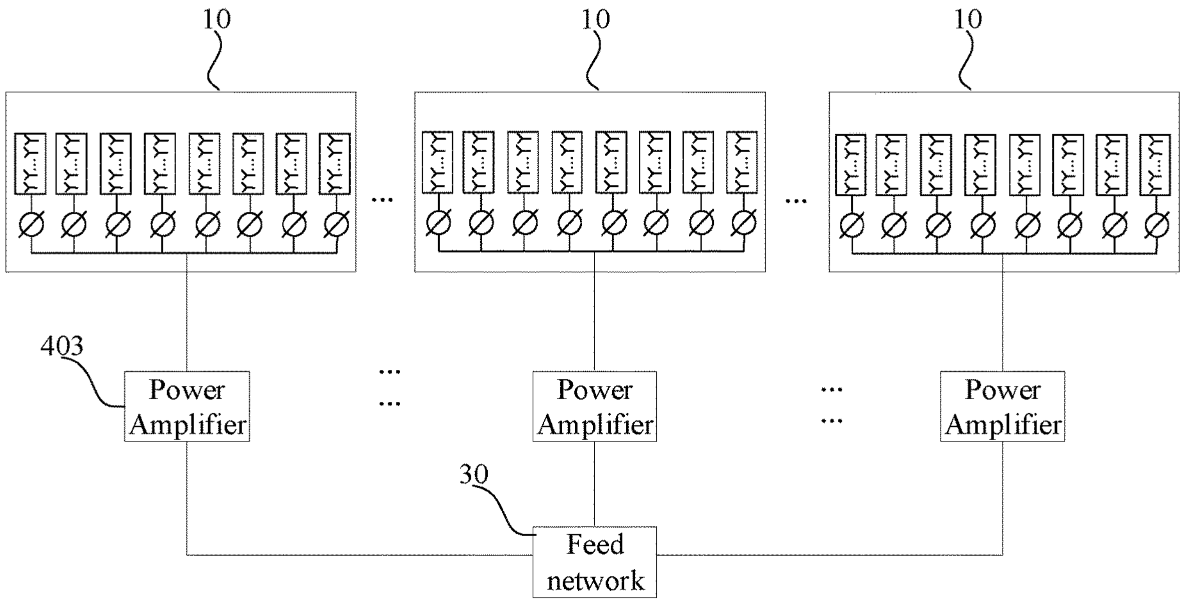
FIG. 11 is another example diagram of a phased array antenna system according to at least one embodiment of the present disclosure.

FIG. 11 is another example diagram of a phased array antenna system according to at least one embodiment of the present disclosure. In some exemplary embodiments, as shown in FIG. 11, multiple array antenna modules 10 are connected to multiple signal conditioning units in one-to-one correspondence. The array antenna modules 10 are configured to transmit signals. A signal conditioning unit includes a Power Amplifier (PA) 403 which is connected between the feed network 30 and the array antenna module 10.

In some exemplary embodiments, the phased array antenna system may include an array antenna module configured to receive a signal and an array antenna module configured to transmit a signal. However, this embodiment is not limited to this.

Figure 12:
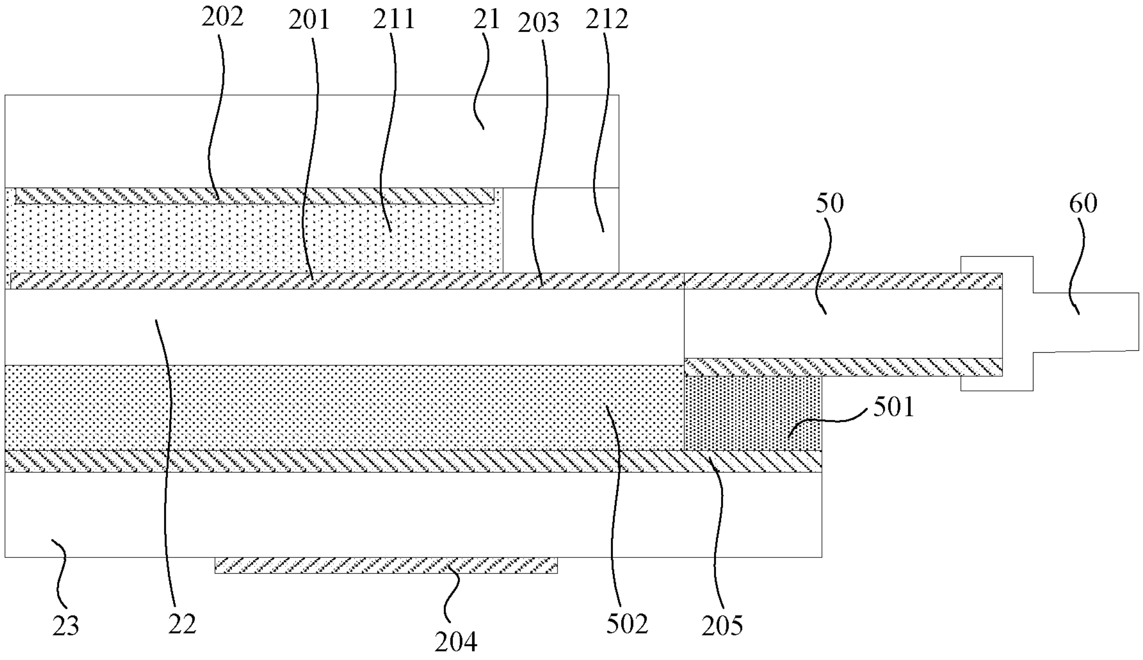
FIG. 12 is a schematic diagram of a partial section of a phased array antenna system according to at least one embodiment of the present disclosure.

FIG. 12 is a schematic diagram of a partial section of a phased array antenna system according to at least one embodiment of the present disclosure. In some exemplary embodiments, as shown in FIG. 12, the feed structure and the phase shift structure of the array antenna module are disposed between the first substrate 21 and the second substrate 22, and the radiation structures are disposed on opposite sides of the third substrate 23. The first ground layer 205 is disposed on a side of the third substrate 23 close to the second substrate 22, and the fourth conductive layer 204 is disposed on a side of the third substrate 23 away from the second substrate 22. The third substrate 23 may be fixed on a side of the second substrate 22 away from the first dielectric layer 211 and the second dielectric layer 212 through a sheet-like adhesive 502 without conductivity. The feed network and the signal conditioning unit may be disposed on a Printed Circuit Board (PCB) 50. A signal wiring layer of the PCB 50 may be connected to the feed structure of the array antenna module, for example, the signal wiring layer and the feed structure are connected through a conductive adhesive. A ground wiring of the PCB 50 may be connected to the first ground layer 205 of the array antenna module through a conductive adhesive 501, so as to achieve complete conduction of a ground plane. The PCB 50 is connected to a connection structure 60 to support connections between the phased array antenna system and other elements. In some examples, the connection structure 60 may be a radio frequency coaxial connector SMA. However, this embodiment is not limited to this.

For the description of a sectional structure of the array antenna module of this embodiment, reference may be made to the description of the foregoing embodiments, which will not be repeated here.

A beam scanning function of a certain dimension may be achieved through the phased array antenna system according to the exemplary embodiment, which may have a lower section and can save costs.

Figure 13:
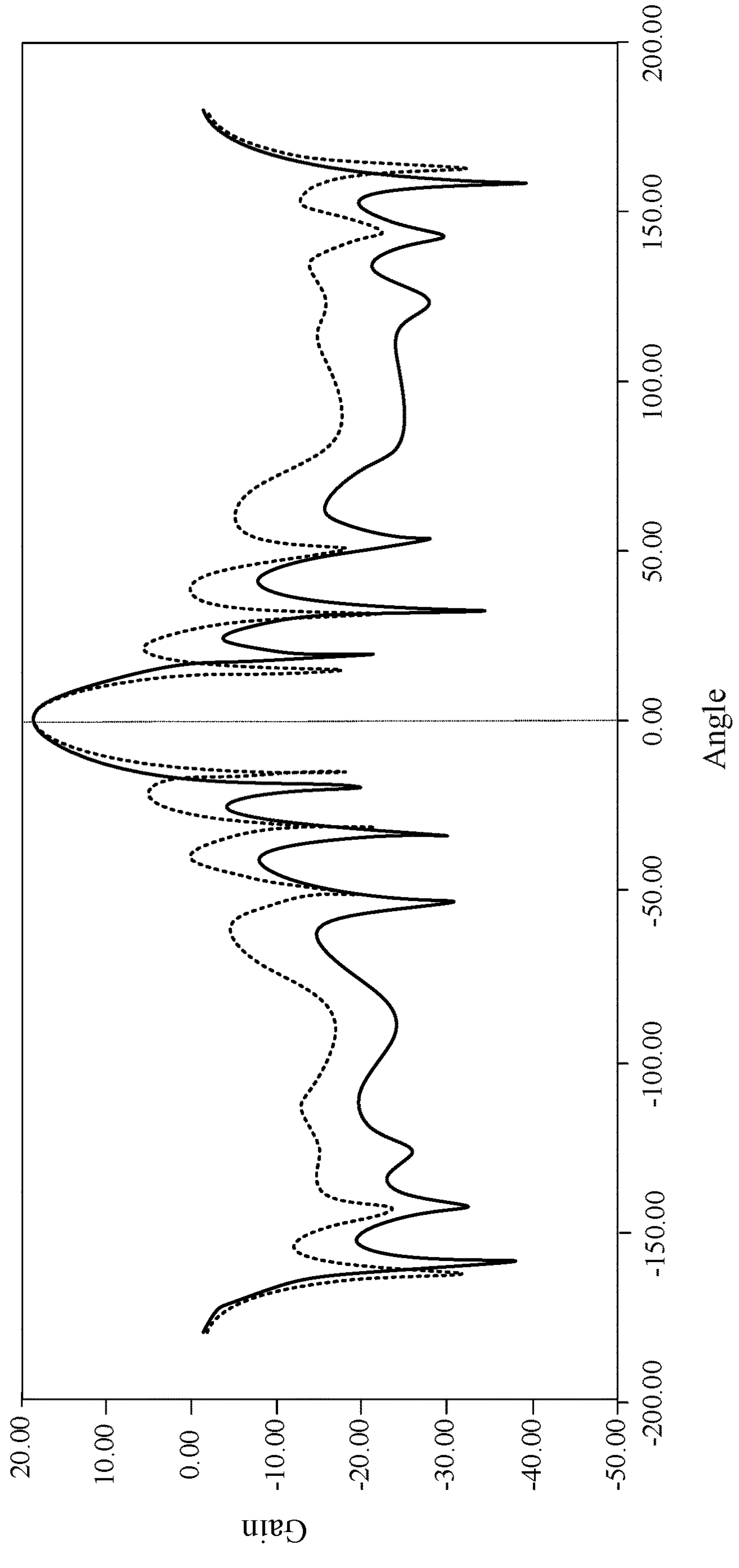
FIG. 13 is a simulation diagram of a phased array antenna system according to at least one embodiment of the present disclosure.

FIG. 13 is a simulation pattern of a phased array antenna system according to at least one embodiment of the present disclosure. An abscissa of FIG. 13 is a pitch angle θ, which shows an included angle with respect to the Z axis, and an ordinate is an actual gain. A dotted line in FIG. 13 represents a case where energies of multiple outputs of the feed network are consistent. A solid line represents a simulation result after adding a window function to a front terminal of the array antenna module, so that the energies of multiple outputs are set according to a certain rule.

In this exemplary embodiment, with the arrangement of the signal conditioning unit, window function loading may be achieved, and a superposition state of radiation waves in space may be changed, so as to achieve effects of reducing sidelobes and broadening beam widths.

Figure 14:
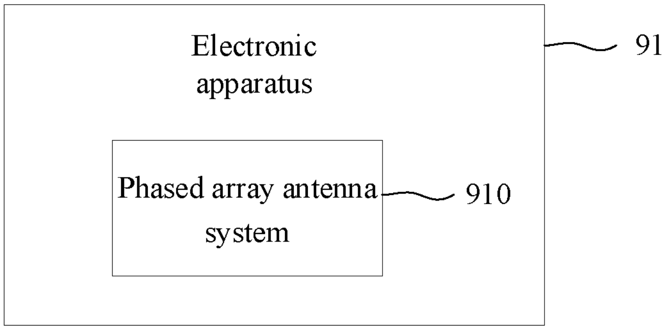
FIG. 14 is a schematic diagram of an electronic device according to at least one embodiment of the present disclosure.

FIG. 14 is a schematic diagram of an electronic device according to at least one embodiment of the present disclosure. As shown in FIG. 14, this embodiment provides an electronic device 91, which includes a phased array antenna system 910. The phased array antenna system 910 is the phased array antenna system provided in the foregoing embodiments. The electronic device 91 may be any product or component with communication functions such as a smart phone, a navigation device, a game machine, a television (TV), a car audio, a tablet computer, a Personal Multimedia Player (PMP), a Personal Digital Assistant (PDA), etc. However, this embodiment is not limited to this.

The drawings in the present disclosure only refer to the structures involved in the present disclosure, and common designs may be referred to for other structures. The embodiments of the present disclosure and features in the embodiments may be combined with each other to obtain a new embodiment if there is no conflict.

Those of ordinary skills in the art should understand that modifications or equivalent substitutions may be made to the technical solutions of the present disclosure without departing from the spirit and scope of the technical solutions of the present disclosure, all of which should be included within the scope of the claims of the present disclosure.

What is claimed is:

1. An array antenna module, comprising:

a feed structure, a phase shift structure, and a radiation structure; the feed structure is connected to the phase shift structure, and the phase shift structure is connected to the radiation structure; the feed structure, the phase shift structure, and the radiation structure are all disposed on a glass substrate, wherein the glass substrate comprises a first substrate, a second substrate on a side of the first substrate, and a third substrate on a side of the second substrate away from the first substrate; and the feed structure and the phase shift structure are disposed between the first substrate and the second substrate; the radiation structure is disposed on at least one side of the third substrate, wherein the phase shift structure comprises a first dielectric layer located between the first substrate and the second substrate, a first conductive layer located on a side of the second substrate close to the first dielectric layer, and a second conductive layer located on a side of the first substrate close to the first dielectric layer; and an orthographic projection of the second conductive layer on the second substrate partially is overlapped with an orthographic projection of the first conductive layer on the second substrate.

2. The array antenna module of claim 1, wherein the first conductive layer comprises a first signal line, and the second conductive layer comprises first electrodes arranged periodically; an orthographic projection of the first signal line on the second substrate and an orthographic projection of the first electrodes on the second substrate are overlapped with each other.

3. The array antenna module of claim 2, wherein the feed structure comprises a second dielectric layer located between the first substrate and the second substrate, and a third conductive layer located on a side of the second dielectric layer; the third conductive layer is disposed in a same layer as the first conductive layer or the second conductive layer;

an orthographic projection of the second dielectric layer on the second substrate is not overlapped with an orthographic projection of the first dielectric layer on the second substrate, and the first dielectric layer and the second dielectric layer are isolated from each other by a sealant.

4. The array antenna module of claim 1, wherein the feed structure comprises a second dielectric layer located between the first substrate and the second substrate, and a third conductive layer located on a side of the second dielectric layer; the third conductive layer is disposed in a same layer as the first conductive layer or the second conductive layer;

an orthographic projection of the second dielectric layer on the second substrate is not overlapped with an orthographic projection of the first dielectric layer on the second substrate, and the first dielectric layer and the second dielectric layer are isolated from each other by a sealant.

5. The array antenna module of claim 4, wherein the first dielectric layer comprises a liquid crystal material and the second dielectric layer comprises air.

6. The array antenna module of claim 4, wherein the radiation structure comprises a fourth conductive layer located on a side of the third substrate away from the second substrate and a first ground layer located on a side of the third substrate close to the second substrate.

7. The array antenna module of claim 6, wherein the first ground layer has at least one opening; an orthographic projection of the opening on the second substrate is overlapped with an orthographic projection of the fourth conductive layer on the second substrate, and is overlapped with the orthographic projection of the first conductive layer on the second substrate.

8. The array antenna module of claim 6, wherein the third conductive layer comprises a second signal line, and the second signal line and the first ground layer form a parallel-fed microstrip structure or a series-fed microstrip structure.

9. The array antenna module of claim 6, wherein the feed structure further comprises a second ground layer located on a side of the first substrate away from the second dielectric layer.

10. The array antenna module of claim 1, wherein the phase shift structure comprises at least one phase shifter, and each phase shifter has a first phase shift output terminal and a second phase shift output terminal which are oppositely disposed, and a phase difference between the first phase shift output terminal and the second phase shift output terminal is 180 degrees.

11. The array antenna module of claim 10, wherein the radiation structure comprises at least one radiation unit sub-array, and the at least one phase shifter and the at least one radiation unit sub-array are in one-to-one correspondence; and the radiation unit sub-array comprises at least one first radiation unit and at least one second radiation unit, the first phase shift output terminal of the phase shifter is configured to feed a first radiation unit of a corresponding radiation unit sub-array, and the second phase shift output terminal of the phase shifter is configured to feed a second radiation unit of a corresponding radiation unit sub-array.

12. A phased array antenna system, comprising a feed network and at least one array antenna module of claim 1;

wherein the feed network is connected to the at least one array antenna module, and the feed network and the at least one array antenna module are disposed on different substrates.

13. The phased array antenna system of claim 12, wherein the feed network is disposed on a printed circuit board (PCB), and a ground wiring of the PCB is connected to the first ground layer of the array antenna module through a conductive adhesive.

14. A method for manufacturing an array antenna module, configured to manufacture the array antenna module of claim 1, the method comprising:

forming a feed structure and a phase shift structure between a first substrate and a second substrate;

forming a radiation structure on at least one side of a third substrate; and disposing the third substrate on a side of the second substrate away from the first substrate.

* * * * *